R. G. ROBERTS.
AXLE NUT LOCK.
APPLICATION FILED MAR. 31, 1908.
899,188.
Patented Sept. 22, 1908.
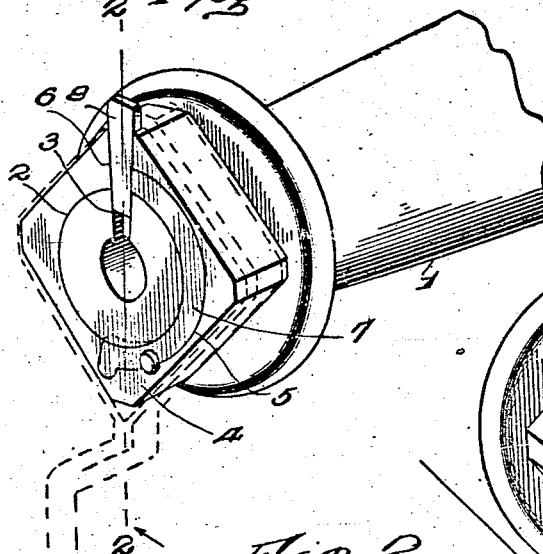
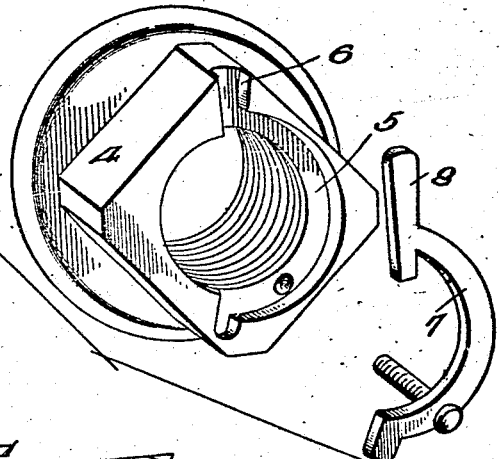
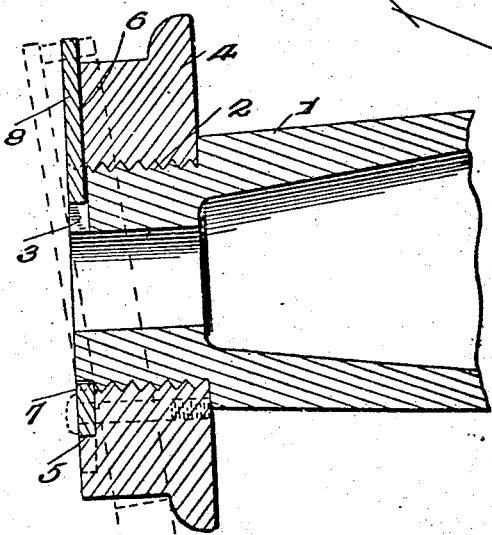
Inventor
R. G. Roberts

UNITED STATES PATENT OFFICE.

ROBERT G. ROBERTS, OF NORTH YAMHILL, OREGON.

AXLE-NUT LOCK.

No. 899,188.  Specification of Letters Patent.  Patented Sept. 22, 1908.

Application filed March 31, 1908. Serial No. 424,410.

To all whom it may concern:

Be it known that I, ROBERT G. ROBERTS, a citizen of the United States, residing at North Yamhill, in the county of Yamhill and State of Oregon, have invented certain new and useful Improvements in Axle-Nut Locks, of which the following is a specification.

The object of this invention is a simple, durable and efficient construction of nut lock which is arranged to automatically lock an axle nut upon the axle so as to prevent any further tightening movement of the nut upon the axle, and also to prevent the accidental disengagement of the former from the latter.

With this and other objects in view that will more fully appear as the description proceeds, the invention consists in certain constructions and arrangements of the parts that I shall hereinafter fully describe and then point out the novel features thereof in the appended claims.

For a full understanding of the invention and the merits thereof, and to acquire a knowledge of the details of construction reference is to be had to the following description and accompanying drawing, in which:

Figure 1 is a perspective view of my improved nut lock, showing it applied; Fig. 2 is a section on the line 2—2 of Fig. 1, showing in dotted lines a wrench applied to the nut and springing the keeper out of position; and, Fig. 3 is a perspective view showing the nut and keeper in juxtaposition.

Corresponding and like parts are referred to in the following description and indicated in all the views of the drawing, by the same reference characters.

Referring to the drawing, the numeral 1 designates an axle which may be of any desired construction or design, except that it is threaded near its end, as indicated at 2, and is formed in such end with a radially extending recess 3.

An axle nut 4 is designed to be mounted upon the axle 1 and engaged with the threads 2 thereof, and is formed in its exterior face with a semi-circular recess 5 that communicates with the central opening extending through the nut, said nut being also formed with a groove 6 leading from one end of the recess and extending radially outward therefrom, as shown. A substantially semi-circular spring keeper 7 is normally received in the recess 5, and is rigidly secured at one end therein, said keeper being formed at its other end with a laterally enlarged head 8 that is spring-pressed so as to normally fit in the groove 6 with its extremities projecting inwardly and outwardly beyond the nut, as shown.

In the practical use of my improved nut lock, the axle nut 4 is mounted upon the axle 1 and engaged with the threads 2 thereof. Upon the advancement of the nut, the inner extremity of the head 8 abuts against the end of the axle, which results in the head 8 being sprung out of the groove 6 until the nut subsequently assumes such a position that the groove 6 thereof is in alinement with the recess 3, whereupon the head 8 returns to its normal position in the groove 6, with its inner extremity fitting in the recess 3 and holding the nut rigidly upon the axle with its outer face substantially flush with the end thereof. In removing the nut 4 from the axle, a wrench or similar instrument is engaged with the same, and is rocked so that one of the jaws thereof will bear against the outer extremity of the head 8 and spring the latter out of the groove 6 and the channel 3, thus unlocking the nut and permitting it to be removed from the axle in the ordinary manner.

From the above description, in connection with the accompanying drawing, it will be apparent that I have provided a simple, durable and efficient construction of axle nut lock which is arranged to effectually secure the axle nut to the axle and permit the nut to be readily removed from the latter when such is desired, and which consists of comparatively few parts that may be easily and cheaply manufactured and quickly assembled.

Having thus described the invention, what I claim is:

The combination with a threaded element formed in its end with a radially extending recess, of a nut adapted to be screwed on such element and formed in its face with a circumferential recess and with a radially extending groove that communicates with one end of the same, and a segmental spring keeper rigidly secured at one end of the recess in the nut and formed at its other or free end with an angularly disposed head that projects beyond the inner and outer walls of the nut and is arranged to ride upon the end of the threaded element and snap into the recess therein and into the groove, when the same are brought into alinement.

In testimony whereof I affix my signature in presence of two witnesses.

ROBERT G. ROBERTS. [L. S.]

Witnesses:
T. McLaughlin,
E. J. Wiser.